March 6, 1934.  J. E. COLLINS ET AL  1,949,899
METHOD OF AND APPARATUS FOR MAKING GLASSWARE
Filed Feb. 1, 1932  2 Sheets-Sheet 1
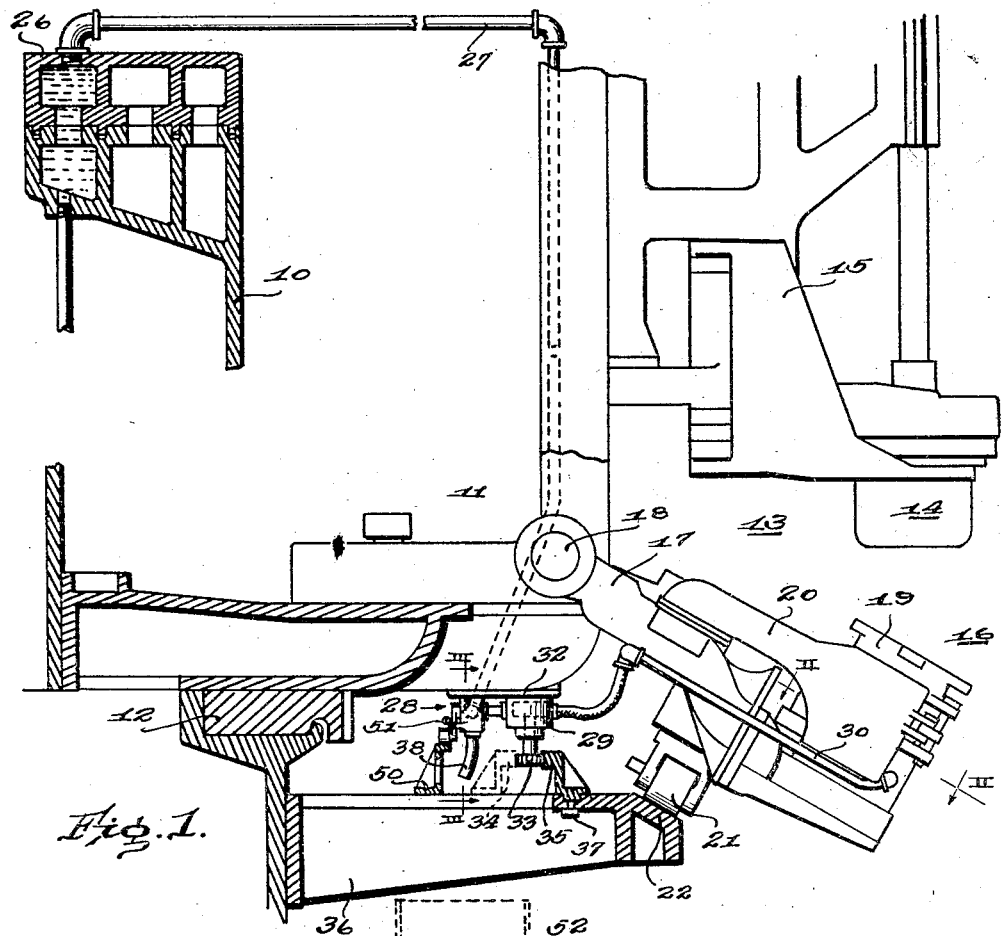
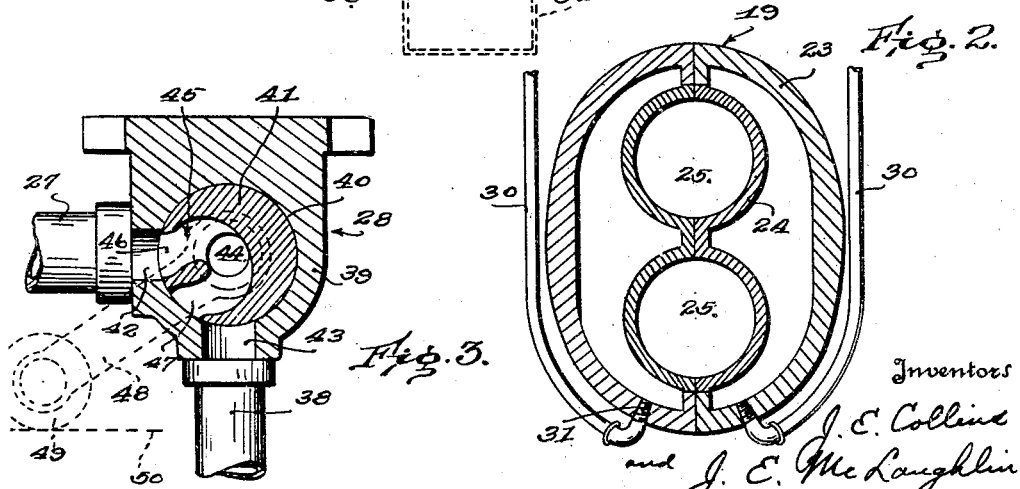
Inventors
J. E. Collins
and J. E. McLaughlin
By J. F. Rule
Attorney March 6, 1934. J. E. COLLINS ET AL 1,949,899
METHOD OF AND APPARATUS FOR MAKING GLASSWARE
Filed Feb. 1, 1932 2 Sheets-Sheet 2
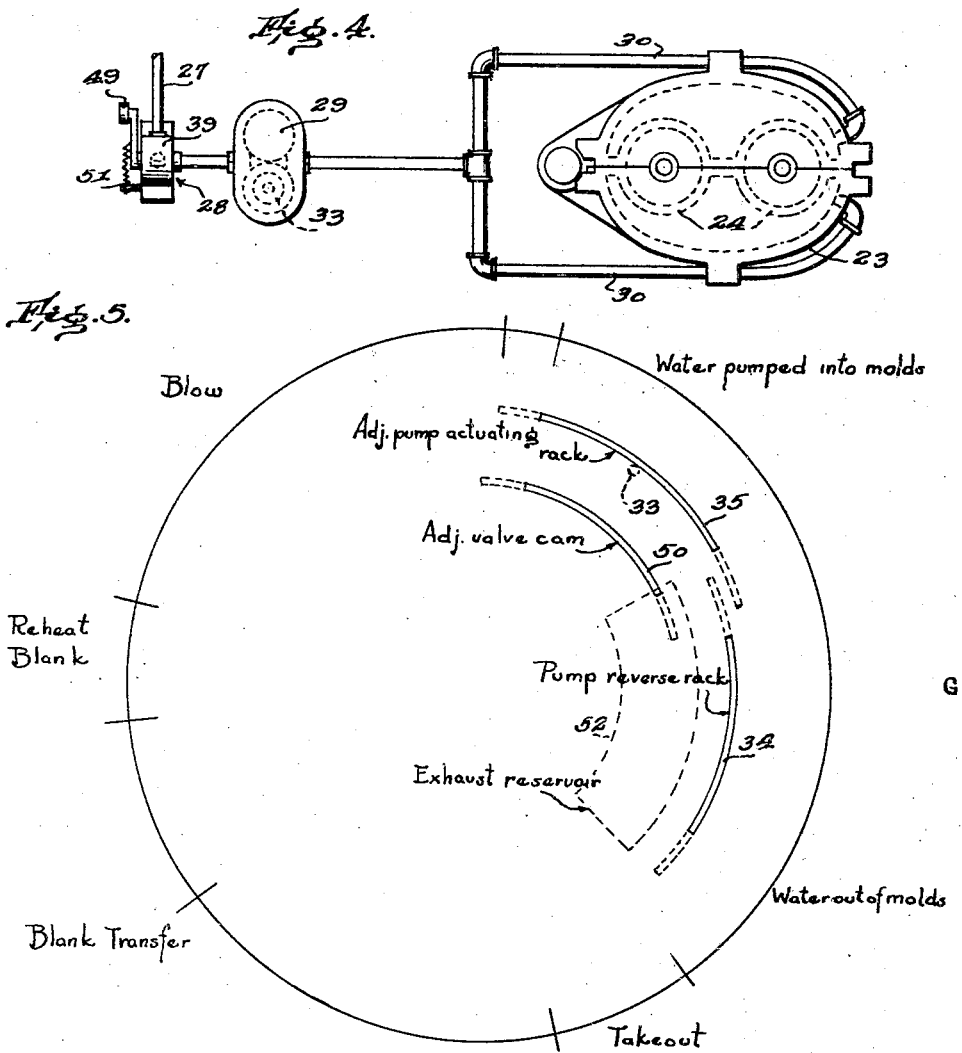
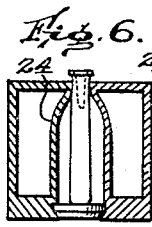
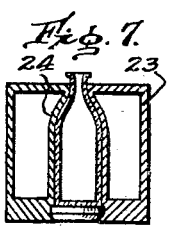
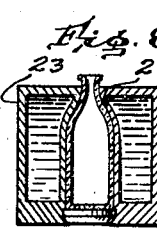
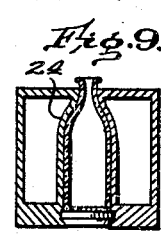
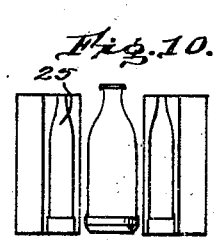

Patented Mar. 6, 1934

1,949,899

UNITED STATES PATENT OFFICE 1,949,899

METHOD OF AND APPARATUS FOR MAKING GLASSWARE

John E. Collins, Toledo, Ohio, and John E. McLaughlin, Alton, Ill., assignors to Owens-Illinois Glass Company, a corporation of Ohio Application February 1, 1932, Serial No. 590,184

9 Claims. (Cl. 49—40)

The present invention relates to improvements in method of and apparatus for producing glassware such, for example, as bottles and jars, and has for an object the provision of means whereby the production of high grade glassware may be materially increased as compared with the present rate of production.

In operating a conventional form of bottle machine the cycle of operations ordinarily includes the delivery of a mold charge of molten glass to a blank mold in which the glass takes the form of a blank or parison, transferring the blank or parison to a finishing mold, expanding the blank to final shape of the article being produced, and finally opening of the finishing mold for the purpose of discharging the completed article therefrom. The time intervals between these various operations are determined by the quantity of glass and distribution thereof in the articles being produced and the period of time required for the molds to extract sufficient heat from the articles to insure that upon their discharge from the finishing mold they will be sufficiently rigid to support themselves. An increase in the operating speed of the usual bottle forming machine as the sole means of increasing production, will, almost invariably, result in the discharge of articles of glassware in such plastic condition that they immediately collapse completely or become so distorted that they must be discarded. Artificial cooling of the finishing molds without regard to the extent and points at which the cooling is effected cannot be relied upon to increase production of high grade glassware. In fact, improper cooling of the finishing molds produces serious defects in the glassware of such a nature that the ware cannot be marketed. Production of "opal glass" is one of the most outstanding objectionable results.

An object of the present invention is the provision of an improved method and apparatus whereby the temperature conditions in the finishing molds may be controlled to such an extent that high grade glassware may be produced at an exceptionally high rate of speed.

A further object is the provision of an improved method of and apparatus for producing articles of glassware in which the finishing molds are alternately cooled and heated during each cycle of operations prior to removal of articles of glassware therefrom whereby these articles may be quickly set without creating defects of any nature whatever therein. To this end the invention provides for a predetermined degree of rapid artificial cooling of the finishing molds immediately upon expansion of the articles of glassware therein, discontinuance of this artificial cooling and thereafter some extent of reheating of the mold due to contact with the article of glassware, these cooling and reheating operations taking place just in advance of arrival of the mold at the usual article discharging zone.

Other objects will be in part apparent and in part pointed out hereinafter.

In the drawings:

Fig. 1 is a sectional elevational view illustrating the embodiment of our invention in one head or mold group of an Owens type of bottle forming machine.

Fig. 2 is a sectional view taken substantially along the line II—II of Fig. 1.

Fig. 3 is a sectional view showing in detail the valve for regulating the flow of liquid cooling medium to and from the corresponding finishing mold.

Fig. 4 is a plan view illustrating the general arrangement of a finishing mold and cooling apparatus in accordance with the present invention.

Fig. 5 is a chart showing substantially the cycle of operations involved in the production of glassware on a machine equipped with our invention.

Figs. 6 to 10 inclusive illustrate the successive operations involved in transforming a parison into a finished article in accordance with our invention.

Fig. 6 shows the unexpanded parison in the finishing mold.

Fig. 7 shows the parison expanded.

Fig. 8 shows a cooling medium in the chambered mold sections.

Fig. 9 shows the completed article in the mold.

Fig. 10 shows the mold open and finished article supported on the bottom plate.

Although our invention may well be embodied in other types of bottle forming machines, we have elected to illustrate it in connection with an automatic machine of the Owens suction type such as that disclosed in LaFrance Patent 1,185,687, June 6, 1916, to which reference may be had for details of construction and operation.

This type of machine comprises a vertical central column 10 upon which a rotary mold carriage 11 is supported. A ring gear 12 at the lower end of the mold carriage runs in mesh with a driving pinion (not shown) which may receive its power from an electric motor or the like (not shown). Rotation of the mold carriage causes movement of mold groups 13 or heads in succession past a series of operating positions corresponding to those involved in the LaFrance patent above identified and including charge gathering, blank transfer; final blowing, and article discharging positions, in the order named.

Each mold group 13 may include a blank or parison mold 14 supported on a dipping frame 15 in the usual manner. A finishing mold unit 16 arranged directly beneath the corresponding blank mold includes a finishing mold carrier 17 pivoted at its inner end to horizontal trunnions 18. A sectional finishing mold 19 consisting of two half sections connected to scissor arms 20, as is customary, is arranged on the upper side of the mold carrier at the outer end thereof. A roller 21 on the lower side of the mold carrier 17 rides upon a serpentine track 22 which may be identical in construction and function to the disclosure in said LaFrance patent. The sole purpose of this serpentine track is to control the successive positions of the finishing mold units. In this connection the finishing mold is raised to a level position for effecting transfer of blanks or parisons into and expanding the blanks or parisons to the form of the finished articles. Shortly after final shaping of the articles the finishing molds are lowered so that they will clear the revolving pot or other container of molten glass from which the mold charges are obtained. After the finishing molds have moved beyond the revolving pot, they are ordinarily lifted a short distance so that they will be inclined at the proper angle during the article discharging operation.

For the purpose of rapidly cooling the finished articles while they are in the finishing molds without detrimentally affecting the glass structure or its appearance, provision is made for artificial cooling of the finishing molds and some degree of reheating thereof while they are moving from the final blowing position to the article discharging or take-out position, a distance of approximately 90°. According to the present invention this alternate cooling and heating of the finishing molds involves first, rapid artificial cooling of the walls of the finishing molds immediately upon completion of the final blowing or parison expanding operation; second, discontinuance of the forced cooling, and third, reheating of the mold walls to some extent solely due to contact of the walls with the expanded glass articles for a short period of time in advance of the article discharging operation. In this manner the glass may be more or less full set in the shape desired and the walls of the mold cavities afterward reheated so that they will not unduly or prematurely cool the next parison or parisons enclosed therein. The construction whereby the above results are obtained may be substantially as follows.

Each section of the finishing mold 19 is of hollow formation consisting of an outer wall 23 and a relatively thin inner wall 24, the latter shaped to provide one-half of the mold cavity or cavities 25. The upper and lower ends of these walls are connected by closure plates to thereby provide a completely closed chamber. Water or any other suitable cooling medium is supplied to the chambered mold sections under pressure at regular time intervals. For this purpose a water supply chamber 26 is provided at the upper end of the mold carriage 11 and has connection through a main pipe 27, control valve 28, rotary pump 29, and a pair of branch pipes 30 to the chambered mold sections. These branch pipes 30 communicate with the chambers in the mold sections through ports 31 at the outer ends of said mold sections. The valve 28 and rotary pump 29 for each mold group are suitably secured to the lower side of the mold carriage 11 as by means of an attaching plate 32. The pump 29 may be of conventional form and as shown includes a driving pinion 33 which is designed for operative engagement with inner and outer arcuate rack bars 34 and 35, respectively, the latter being suitably supported upon the bracket 36 which carries the serpentine track 22. The pinion 33 is adapted to engage the rack bars 34 and 35 one at a time and in succession, said rack bars being spaced apart circumferentially and radially at opposite sides of the path of travel of the pinion. Thus one rack bar will operate the pump to force a cooling medium into the chambered mold sections while the other rack bar serves to reverse the pump operation and thereby exhaust the cooling medium from said mold sections. These rack bars may be adjustably attached to the bracket 36 by screws 37 or the like fasteners so that the timed relation between operations of the pump may be regulably controlled.

The valve 28 (Figs. 1 and 3) is employed to establish communication between the pump 29 and either the supply pipe 27 or exhaust pipe 38. The valve consists of a casing 39 having a cylindrical chamber 40 therein in which a rotary valve member 41 is arranged. An inlet opening 42 in the valve casing 39 provides communication between the supply pipe 27 and interior of the valve. An exhaust port 43 is provided to establish communication between the interior of the valve and the exhaust pipe 38. At one end of the chamber 40 an outlet opening 44 is formed. This latter opening (Fig. 3) is disposed in register with an axial opening in the valve member 41, the latter also formed with a chamber 45 which in cross section is substantially U-shaped. This chamber has an inlet 46 and an outlet 47 in addition to the axial opening which is at all times in register with the opening 44 through which the water or other cooling medium flows to the pump 29. An operating lever 48 is secured to one end of the rotary valve member 41 and carries a roller 49 designed for periodic engagement with a stationary adjustable cam 50 on the bracket 36, said cam adapted to rock the lever and rotary valve member 41 to a position in which the exhaust port 43 leading to the exhaust pipe 38 is closed and communication between the supply pipe 27 and pump 29 is established. A coil spring 51 serves to yieldingly hold the valve in the reverse position to that just described, during a major portion of each cycle of operations. A receptacle 52 of any preferred form is disposed beneath the path of travel of the valves 28 to receive the water or other cooling medium as it is exhausted from the mold sections.

In operation the blank mold 14 will obtain its mold charge of glass from a suitable source of supply in the zone marked "G" in Fig. 5. This mold moving in a clockwise direction reaches the transfer point where the mold charge, in the form of a blank or a parison, is transferred to the finishing mold 19. Following a bank reheating period, air under pressure is applied to the initial blow opening in the blank, as is customary, resulting in expansion of the glass into intimate contact with the walls of the mold cavity. According to the present invention this final expansion is immediately followed by rapid filling of the chambered mold sections with cold water or other suitable cooling medium, as shown in Fig. 8. Thus considerable heat is extracted from the expanded article. After a predetermined and relatively short period of time this water or other cooling medium is quickly exhausted from the mold sections. Following this removal of the cooling medium from the mold sections, the walls of the mold cavities are reheated to some extent by contact with the expanded article. Afterward the finishing mold is opened in the usual manner and the completed article discharged by gravity or removed by mechanical means.

As a result of equipping bottle forming machines with apparatus of the above character it is evident that production of blown glassware may be increased considerably without detrimentally affecting the quality of the ware. The valve control cam 50 as well as the two rack bars 34 and 35, may be adjusted so that the application of cold water or the like, to the molds may be regulably controlled to meet the specific requirements of the type and size of the glassware being produced. In this connection it is obvious that a small article of glassware will require a considerably shorter period of cooling than will a comparatively large article. Accordingly, this valve control cam 50 may be adjusted to meet these varying conditions.

In Figs. 6 to 10 inclusive, we have illustrated the successive steps involved in the formation of a bottle in accordance with our invention. In Fig. 6 a blank or parison is shown as it appears just after being enclosed in the finishing mold. While in this position and condition, it is reheated for a short period of time prior to the final blowing operation. In Fig. 7 the blank is shown expanded against the walls of the finishing mold cavity. In Fig. 8 the water or other cooling medium has been introduced into the chambered mold sections for the purpose of accelerating extraction of heat from the walls of the mold cavity and necessarily from the expanded article itself. In Fig. 9 the cooling medium has been exhausted from the mold sections to allow some degree of reheating of the cavity walls prior to opening of the mold as shown in Fig. 10.

Modifications may be resorted to within the spirit and scope of the appended claims.

What we claim is:

1. The method of producing glass articles which consists in enclosing a parison in a finishing mold, expanding the parison against the walls of the mold, alternately lowering and raising the temperature of said walls, and then removing the finished article from the mold.

2. The method of producing hollow glass articles which consists in enclosing a parison in a finishing mold, expanding the parison against the walls of the mold, applying a heat extracting medium to said walls, discontinuing application of the heat extracting medium, and after a predetermined time interval removing the article.

3. The method of producing hollow glass articles which consists in enclosing a parison in a finishing mold, completely expanding the parison, applying a liquid cooling medium to the mold, discontinuing such application of the cooling medium to permit a predetermined degree of reheating of the mold by contact with the expanded article, and then removing the article.

4. In a glassware forming machine, a finishing mold comprising partible cooperating hollow sections, means for forming and placing a parison in the mold, means for expanding the parison to its final shape in the mold, and automatic means brought into activity after said expansion of the parison for supplying a cooling medium to the mold sections and after a predetermined time interval removing the cooling medium therefrom prior to removal of the expanded article from the mold.

5. In a glassware forming machine, a finishing mold comprising partible cooperating hollow sections, means for forming and placing a parison in the mold, means for expanding the parison to its final shape in the mold, automatic means brought into activity after said expansion of the parison for supplying a cooling medium to the mold sections and after a predetermined time interval removing the cooling medium therefrom prior to removal of the expanded article from the mold, the last named means including a conduit for the cooling medium, a force pump in said conduit, and means for operating said pump to cause movement of the cooling medium in either direction through the conduit.

6. In a glassware forming machine, a finishing mold formed of separable hollow sections, means for forming a parison and placing it in the finishing mold, means for expanding the parison to its final shape in the mold, temperature regulating means for the mold including a source of supply of liquid cooling medium, a conduit connecting said source of supply and the hollow mold sections, a force pump in said conduit for causing movement of the cooling medium in either direction through said conduit, and an automatic valve in the conduit between said source of supply of cooling medium and pump, said valve in one position establishing communication between said source of supply and pump and in another position functioning as an outlet for cooling medium being removed from the mold sections.

7. In a glassware forming machine, a finishing mold formed of separable hollow sections, means for forming a parison and placing it in the finishing mold, means for expanding the parison in the mold, temperature regulating means for the mold including a source of supply of liquid cooling medium, a conduit connecting said source of supply and the hollow mold sections, a force pump in said conduit for causing movement of the cooling medium in either direction through said conduit, an automatically operating valve in the conduit between the source of supply and pump, said valve in one position establishing communication between said source of supply and pump and in another position functioning as an outlet for cooling medium being removed from the mold sections, and an adjustable cam for operating said valve and in part regulably controlling the period of time during which the cooling medium is in the mold sections.

8. In a glassware forming machine, a finishing mold formed of separable hollow sections, means for forming a parison and placing it in the finishing mold, means for expanding the parison in the mold, temperature regulating means for the mold including a source of supply of liquid cooling medium, a conduit connecting said source of supply and the hollow mold sections, a force pump in said conduit for causing movement of the cooling medium in either direction through said conduit, an automatically operating valve in the conduit between the source of supply and pump, said valve in one position establishing communication between the source of supply of cooling medium and pump and in another position functioning as an outlet for cooling medium being removed from the mold sections, means for operating said pump including a pinion connected to the pump, a pair of rack bars spaced apart and adapted to engage opposite sides of the pinion one at a time, and means to cause relative movement between the pump and rack bars.

9. In a glassware forming machine, a finishing mold formed of separable hollow sections, means for forming a parison and placing it in the finishing mold, means for expanding the parison to its final shape in the mold, temperature regulating means for the mold including a source of supply of liquid cooling medium, a conduit connecting said source of supply and the hollow mold sections, a force pump in said conduit for causing movement of the cooling medium in either direction through said conduit, an automatically operating valve in the conduit between the source of supply and pump, said valve in one position establishing communication between said source of supply of cooling medium and pump and in another position functioning as an outlet for the cooling medium being removed from the mold sections, means for operating said pump including a pinion connected to the pump, a pair of rack bars spaced apart and adapted to engage opposite sides of the pinion one at a time, means to cause relative movement between the pump and the rack bars, and means for adjusting the relative positions of the rack bars to thereby correspondingly change the time interval between forcing the cooling medium into the mold sections and exhausting said cooling medium therefor.

JOHN E. COLLINS.
JOHN E. McLAUGHLIN.